United States Patent
Beard et al.

[11] Patent Number: 5,898,290
[45] Date of Patent: Apr. 27, 1999

[54] BATTERY PACK WITH CAPACITY AND PRE-REMOVAL INDICATORS

[75] Inventors: Paul Beard, Milpitas, Calif.; Robert J. Grabon, Cedar Rapids, Iowa

[73] Assignee: Norand Corporation, Cedar Rapids, Iowa

[21] Appl. No.: 08/711,447

[22] Filed: Sep. 6, 1996

Related U.S. Application Data

[60] Provisional application No. 60/003,342, Sep. 7, 1995, and provisional application No. 60/003,543, Sep. 11, 1995.

[51] Int. Cl.$^6$ ............................ H01M 10/48; H01M 2/10; G06F 3/02
[52] U.S. Cl. .................................. 320/2; 429/97; 307/116
[58] Field of Search ............................ 320/2, 48; 429/96, 429/97, 98, 99, 100; 307/116; 323/904

[56] References Cited

U.S. PATENT DOCUMENTS

| | | | |
|---|---|---|---|
| 4,595,913 | 6/1986 | Aubuchon | 307/116 X |
| 4,680,527 | 7/1987 | Benenati et al. | 320/2 |
| 4,942,352 | 7/1990 | Sano | 320/2 |
| 5,216,371 | 6/1993 | Nagai | 324/428 |
| 5,459,388 | 10/1995 | Illingworth et al. | 320/2 |
| 5,465,038 | 11/1995 | Register | 320/2 |
| 5,525,888 | 6/1996 | Toya | 320/2 |
| 5,606,241 | 2/1997 | Patino et al. | 320/48 |

*Primary Examiner*—Peter S. Wong
*Assistant Examiner*—Patrick B. Law
*Attorney, Agent, or Firm*—Stanford & Bennett, L.L.

[57] ABSTRACT

A battery capacity monitoring system readily indicates the remaining capacity of an uninserted battery pack upon an operator's request. Such request may involve the touching of one or more contacts disposed on the battery pack. The battery pack also includes a display and a communication means for communicating capacity information to the device in which it may be installed. The communication means may also be used to display status when the battery pack is not inserted. When inserted a device, the battery pack and device participate to determine time estimates for remaining battery life based on known device loading characteristics and current battery capacity. An operator viewing such information may more adequately determine the usage value of the current battery charge. Moreover, the battery pack and corresponding device are configured to detect the beginning of the process of removing a battery pack. In response, the device saves operational states and data before losing power. Such stored information may be restored upon insertion of another battery pack into the device, permitting the operator to continue where they left off.

17 Claims, 10 Drawing Sheets

BATTERY PACK WITH CAPACITY AND PRE-REMOVAL INDICATORS

CROSS-REFERENCE TO RELATED APPLICATIONS

The present application claims priority pursuant to 35 U.S.C. Sec. 119(e) to U.S. Provisional Application Serial No. 60/003,342 (Attorney Docket No. DN38136), filed Sep. 7, 1995. The present application also claims priorty pursuant to 35 U.S.C. Sec. 119(e) to U.S. Provisional Application Serial No. 60/003,543 (Attorney Docket No. DN38176P1), filed Sep. 11, 1995. Both of said provisional applications are hereby incorporated herein by reference in their entirety.

BACKGROUND

1. Technical Field

The present invention relates generally to battery packs utilized in portable battery powered electronic devices, and, specifically, battery packs which monitor capacity and indicate pre-removal. Electronic devices may respond to such pre-removal indications to, for example, save operational state information prior to power loss.

2. Related Art

Portable electronic battery powered devices have made great advances in increased power and utility in furtherance of achieving reductions in costs and size and increases in portability. Applications of portable electronic devices such as portable data collection and processing terminals often require the operator to be mobile and roaming. As such, portable electronic devices are generally powered by a reusable, self-contained power supply. In particular, portable electronic devices are usually configured with rechargeable batteries, often disposed in some form of battery pack.

Quite often, an operator of a portable electronic device does not know the present state of charge of a battery pack, unknowingly setting off with insufficient battery resources to complete an extended task. In many circumstances, monitoring circuitry which determines the state of charge only exists in associated charging docks. However, if the charging dock is not readily available to the operator, partially and fully discharged battery packs are unfortunately often relied upon. Although monitoring circuitry may also exist within some portable electronic devices, the operator is still forced to install each battery pack into such portable electronic devices to determine the present charge. This process often proves tedious and time consuming, especially when multiple battery packs are needed to complete the task.

For example, when a portable electronic device does provide monitoring circuitry, the operator must: 1) open the battery compartment of the portable electronic device; 2) insert or replace the installed battery pack; 3) close the battery compartment; 4) evaluate the charge level from some type of user interface; and 5) repeat the entire process for each battery needed for a given task and for each battery that proves to be undercharged. To be safe, this process must be carried out each time the operator prepares to leave the vicinity of other available battery packs. Otherwise, the operator is forced to take along many additional battery packs that will typically not need to be used.

Additionally, it is well known that batteries are somewhat ohmic, and battery charge levels generally decreases linearly over time. Thus, the charge state of a battery can be determined by examination of the output voltage of the battery. Various methods of detecting when battery voltage rises or falls below a threshold level are also well known in the art. However, the various methods typically place an additional load on the battery to accomplish such detection. Similarly, displaying any information to an operator causes further battery loading.

As evidence that battery pack charge status via docking and insertion is an insufficient solution to their problems, operators have adopted and rely upon rudimentary, unreliable methods to attempt to determine charge status. For example, many operators short battery pack terminals together with a wet finger or tongue in order to judge the battery pack charge status by the imparted "shock." The use of saliva in such instances is unsanitary, unpleasant and may cause corrosion or otherwise result in resistively coating the battery pack terminals. Such rudimentary techniques are inherently unreliable, suffering from error in human judgment.

Moreover, if an operator removes a battery pack for any reason during the operation of the portable electronic device, the portable electronic device immediately loses its current state of operation including all data associated therewith. Such loss also occurs when a battery pack accidentally pops out of the slot, for example, when a portable electronic device is dropped. With most portable electronic devices, to avoid loss, the user must save, gracefully exit all application programs and turn off the portable electronic device before removing and replacing the battery. This entire process is very time consuming, annoying and unavailable upon accidental battery removal.

Thus, there lies a need for the operator of a portable battery powered electronic device to be able to readily determine the present state of charge of a battery pack. The operator needs to be able to readily compare the present state of charge of a battery pack to the states of charge of several rechargeable battery packs at once, and to be able to make quick, simple and accurate determinations of remaining battery capacity. Further, there lies a need for the operator to be able to exchange battery packs during use of portable electronic device without being burdened with a time consuming, preparatory shutdown process.

SUMMARY OF THE INVENTION

The present invention provides a battery capacity indicating system which readily indicates to an operator the remaining capacity of a battery. The battery capacity indicating system does not require a physical switch to initiate the battery capacity indicating means, rather the indicating means is initiated upon shorting of at least two of the battery terminals by the operator. The battery capacity information system may operate by instantly determining the present battery voltage to determine battery capacity without requiring the battery capacity information to be stored in electronic memory. The capacity of a battery may be readily determined by the operator while the battery pack is outside of the electronic devices in which it is utilized and held in the operator's hand. While the battery pack is not being utilized, the battery capacity indicating system initiates battery capacity indicating means upon action of the operator, therefore continual monitoring of the state of the battery is not required. The battery capacity indicating system provides quick, simple and accurate indication of the remaining battery capacity.

Other aspects of the present invention may be found in another battery pack configuration that may be inserted by an operator into an electronic device to supply power to the electronic device. The battery pack comprises a housing having a display and at least one terminal disposed thereon.

Disposed within the battery pack, a rechargeable battery may be found along with a sensing circuit that detects the operator making contact with the at least one terminal. A control circuit responds to such detection by delivering to the display information regarding the current charge of the rechargeable battery.

In this battery pack embodiment, the at least one terminal may comprise a single terminal, and the sensing circuit monitors capacitance associated with the single terminal to detect the operator's contact. Alternatively, the at least one terminal may comprise a pair of terminals, and, if so, the sensing circuit detects creation of a current pathway through the operator between the pair of terminals.

The control circuit may also compute usage time estimates when the battery pack is inserted in the electronic device based on the loading characteristics of the electronic device. Similarly, the control circuit may be configured to cause the delivery of current charge information to the electronic device to permit computation by the electronic device of remaining capacity time estimates based on the loading characteristics of the electronic device. To support such and other communication, the battery pack may utilize a wireless transceiver. Although such transceiver may be an independent unit, the display may comprise at least a portion of the transceiver.

The battery pack may also further comprise a plurality of contact terminals disposed on the housing to provide power delivery to the electronic device when the battery pack is inserted therein. Therein, the electronic device may comprise a plurality of variable length contacts that engagingly couple with the plurality of contact terminals of the battery pack to provide pre-removal indications to the electronic device of impending power loss.

In an alternate embodiment, a similar battery pack may comprise among other things a first, second and third contact disposed on the housing to engagingly couple to the electronic device when the battery pack is inserted into the electronic device. The first and second contacts engagingly couple with the electronic device to deliver power to the electronic device. Similarly, the third contact engagingly couples with the electronic device. However, during the process of removing the battery pack from the electronic device, the third contact enables delivery of a pre-removal indication prior to the uncoupling of the first and second contacts from the electronic device.

In particular variations, the third contact is sized and positioned to deliver a pre-removal indication. Such sizing may involve the third contact being shorter than the first and second contacts.

Of course other aspects of the present invention will become apparent with reference to the drawings and entire specification as a whole.

DETAILED DESCRIPTION

Figure 1:
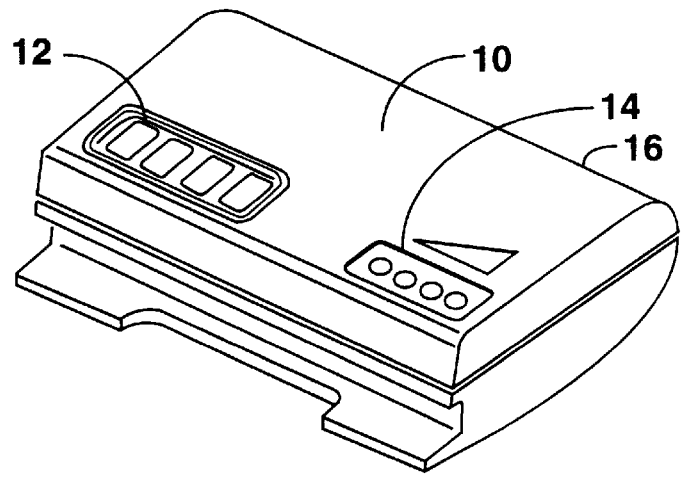
FIG. 1 is a perspective view of an exemplary rechargeable battery pack built in accordance with the present invention.

FIG. 1 illustrates a rechargeable battery pack which incorporates the present invention. The rechargeable battery pack 10 is preferably designed to be utilized in portable electronic equipment such as portable data collection terminals which are typically powered during portable operation by electrochemical battery energy. The portable data terminal in which the battery pack 10 of FIG. 1 is preferably utilized may be itself utilized with mobile computing systems an in-premise wireless local and wide area networks for such applications as route accounting, field sales automation, inventory management and warehouse data management, for example.

The rechargeable battery pack 10 comprises a battery pack housing 16 which contains all of the internal components of the battery pack 10. The rechargeable battery pack 10 preferably has disposed on one side of the housing 16 an array of contact terminals 12. The contact terminals 12 are preferably utilized for the transfer of data and power signals into and out of the rechargeable battery pack 10. For example, two of the contacts 12 terminal may be utilized for the transfer of electric power into and out of the battery back 10 and two of the contact terminals 12 may be utilized for the transfer of electronic data into and out of the rechargeable battery pack 10. The array of contact terminals 12 electrically connect with a set of receiving contact terminals contained in the battery cavity of a portable data terminal (not shown) in order to provide power and data transfer between the portable data terminal and the rechargeable battery pack 10.

The rechargeable battery pack 10 has disposed on one side of the housing 16 a battery capacity indicator display 14 which provides a means for displaying and indicating to the operator the remaining capacity of the rechargeable battery pack 10. In an exemplary embodiment of the present invention, the battery indicator display is a linear array of four light-emitting diodes which sequentially illuminate in accordance with the capacity of the rechargeable battery pack 10.

Figure 2:
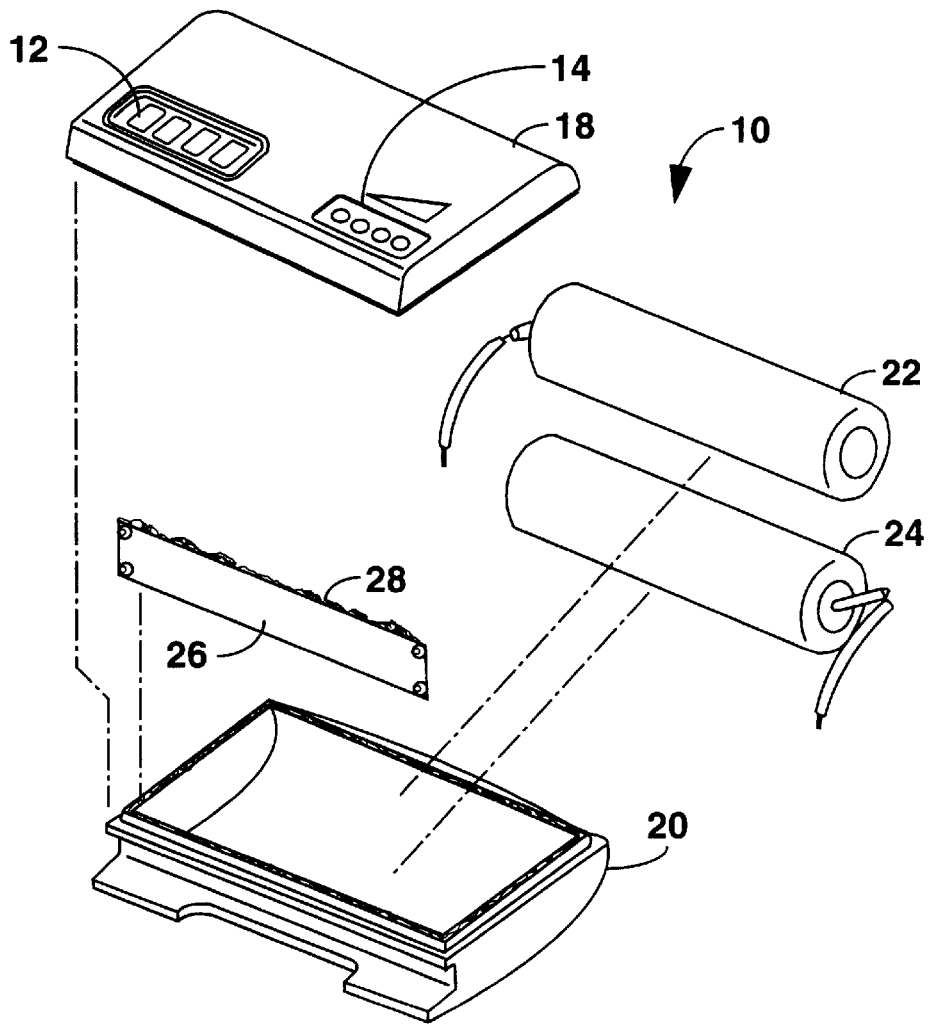
FIG. 2 is an exploded view of the exemplary rechargeable battery pack of FIG. 1.

FIG. 2 illustrates in an exploded view the elemental components of the rechargeable battery pack of FIG. 1. The battery pack housing 16 of the rechargeable battery pack 10 of FIG. 1 preferably comprises an upper housing shell 18 and a lower housing shell 20. The upper housing shell 18 and the lower housing shell 20 preferably contain a pair of electrochemical cells 22 and 24 which provide means storage of electrochemical energy.

In a preferred embodiment of the present invention, the rechargeable battery pack 10 utilizes two electrochemical cells 22 and 24 which are preferably Lithium ion type rechargeable electrochemical cells. Other types of electrochemical cells may be utilized. The pair of electrochemical cells 22 and 24 are preferably electrically connected in series such that the rechargeable battery pack 10 may provide a voltage output which is the sum of the output voltages of individual electrochemical cells 22 and 24. Other electrical configurations of the electrochemical cells 22 and 24 may be utilized as well.

A battery pack printed circuit board (PCB) 26 is preferably contained within the upper housing shell 18 and the lower housing shell 20 of the rechargeable battery pack 10. The battery pack PCB 26 preferably contains electronic circuitry 28 for control of the transfer of battery energy and battery pack data into and out of the battery pack 10 via contact terminals 12. The electronic circuitry 28 of the battery pack PCB 26 preferably receive electrical power from the electrochemical cells 22 and 24 when the battery pack 10 is not being recharged or from an external power source (not shown) when the battery pack 10 is being recharged.

Figure 3:
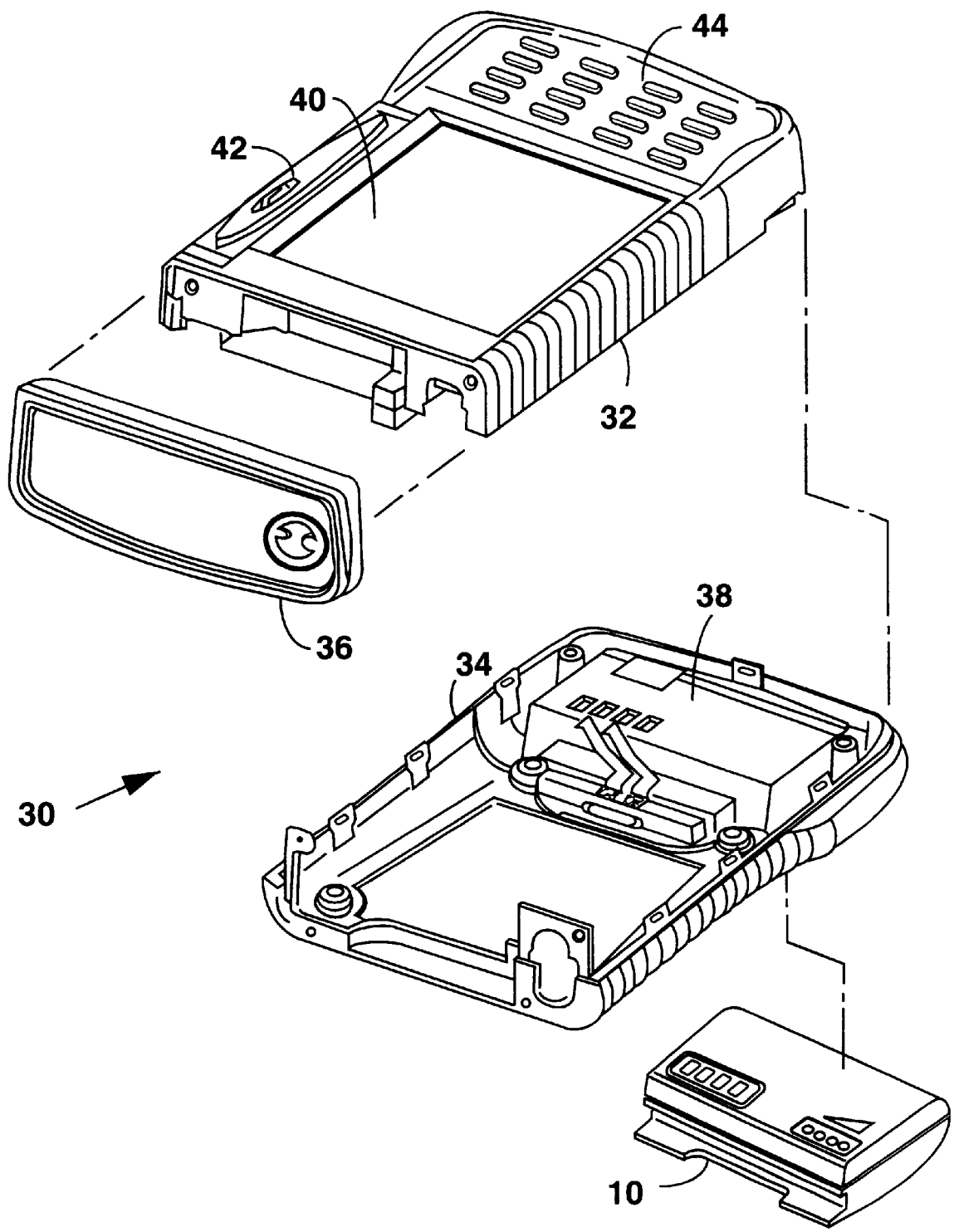
FIG. 3 is an exploded view of a portable battery powered data terminal which may utilize the rechargeable battery pack of FIG. 1.

FIG. 3 illustrates in a somewhat exploded view an exemplary portable data terminal which may utilize and receive operational power from the rechargeable battery pack of the present invention. The preferred portable data terminal 30 may generally comprise an upper body frame 32, a lower body frame and an endcap 36 which comprises the top end portion of the data terminal 30. The endcap 36 provides access to the internal electronic components of the data terminal for insertion and removal of peripheral devices such as PCMCIA (or PC card) type devices. The portable data terminal 30 is preferably designed for portable operation thereof requiring power from a self contained power source, which is the rechargeable battery pack 10 of the present invention in an exemplary embodiment.

Being designed for portable battery powered operation, the portable data terminal 30 preferably includes a video display 40 having touch screen data input means for receiving touch and stylus 42 input. The portable data terminal 30 preferably has a ruggedized keypad 44 as an additional means for data input. The lower frame 38 of the portable data terminal 30 preferably has a battery pack receiving cavity 38 for receiving and retaining the rechargeable battery pack 10 during portable operation thereof.

Figure 4:
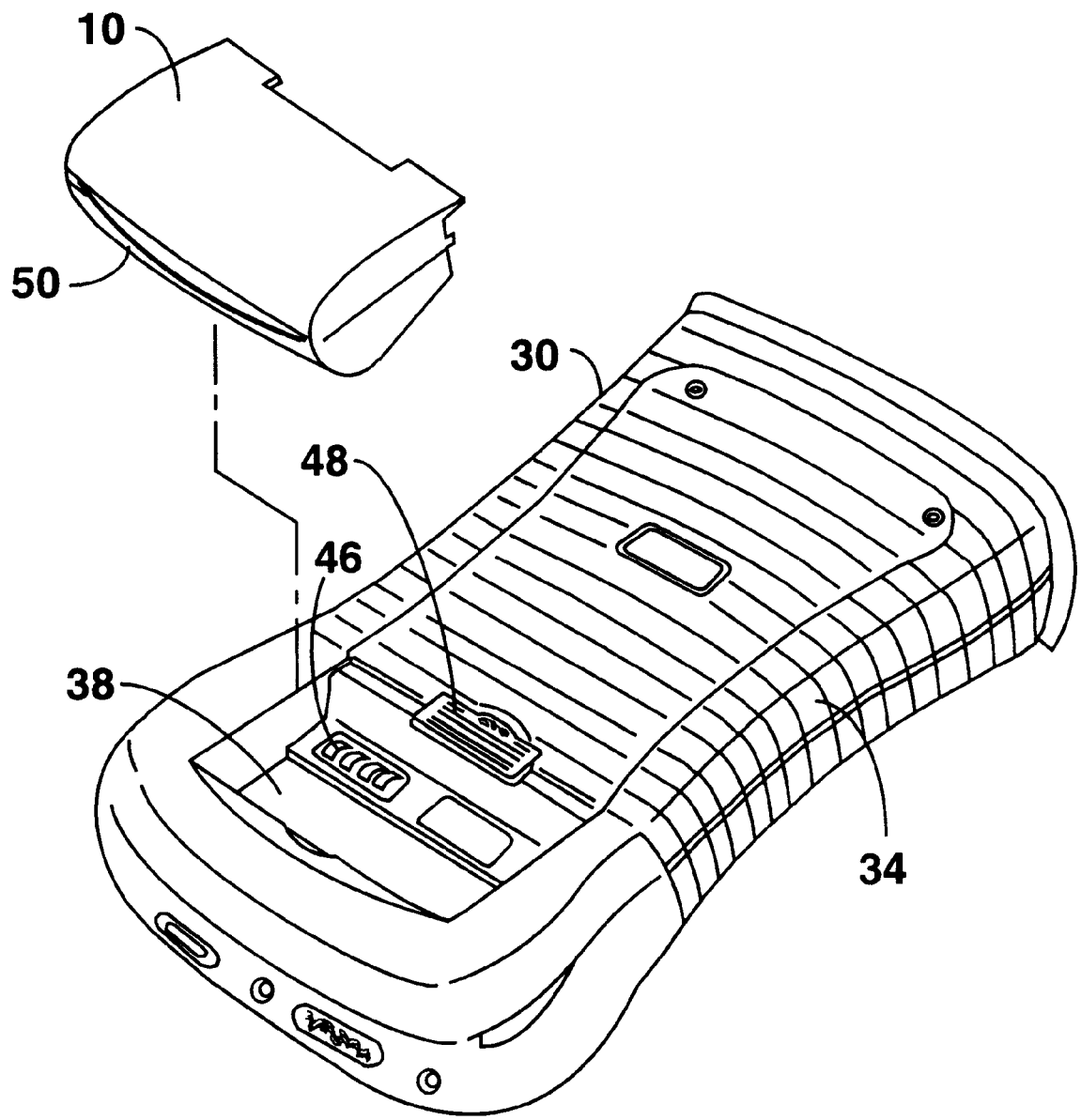
FIG. 4 is a perspective view illustrating the insertion of the rechargeable battery pack of FIG. 1 into the portable battery powered data terminal of FIG. 3.

FIG. 4 illustrates a portable data terminal adapted to receive and utilize the rechargeable battery pack of the present invention. The underside of the portable data terminal 30 as defined by lower frame 34 preferably has a battery pack receiving cavity 38 shaped and adapted to receive the rechargeable battery pack 10 of the present invention. The battery pack receiving cavity 38 preferably has disposed therein an array of flexible spring contacts 46 corresponding to the array of electrical contacts 12 of the rechargeable battery pack as shown in FIG. 1. When the rechargeable battery pack 10 is inserted into the battery pack receiving cavity 38, the individual electrical contacts 12 align and thereby make electrical contact with respective individual flexible spring contacts 46. The rechargeable battery pack 10 may have disposed on one side an extended tab member 50 which may come into forcible contact with a corresponding lip recession (not shown) in the battery pack receiving cavity 38 for providing the battery pack 10 pivoting leverage during insertion thereinto. The battery pack 10 may then be rotated into position with the battery cavity 38 and secured therein with a slidable spring latch 48.

Figure 5:
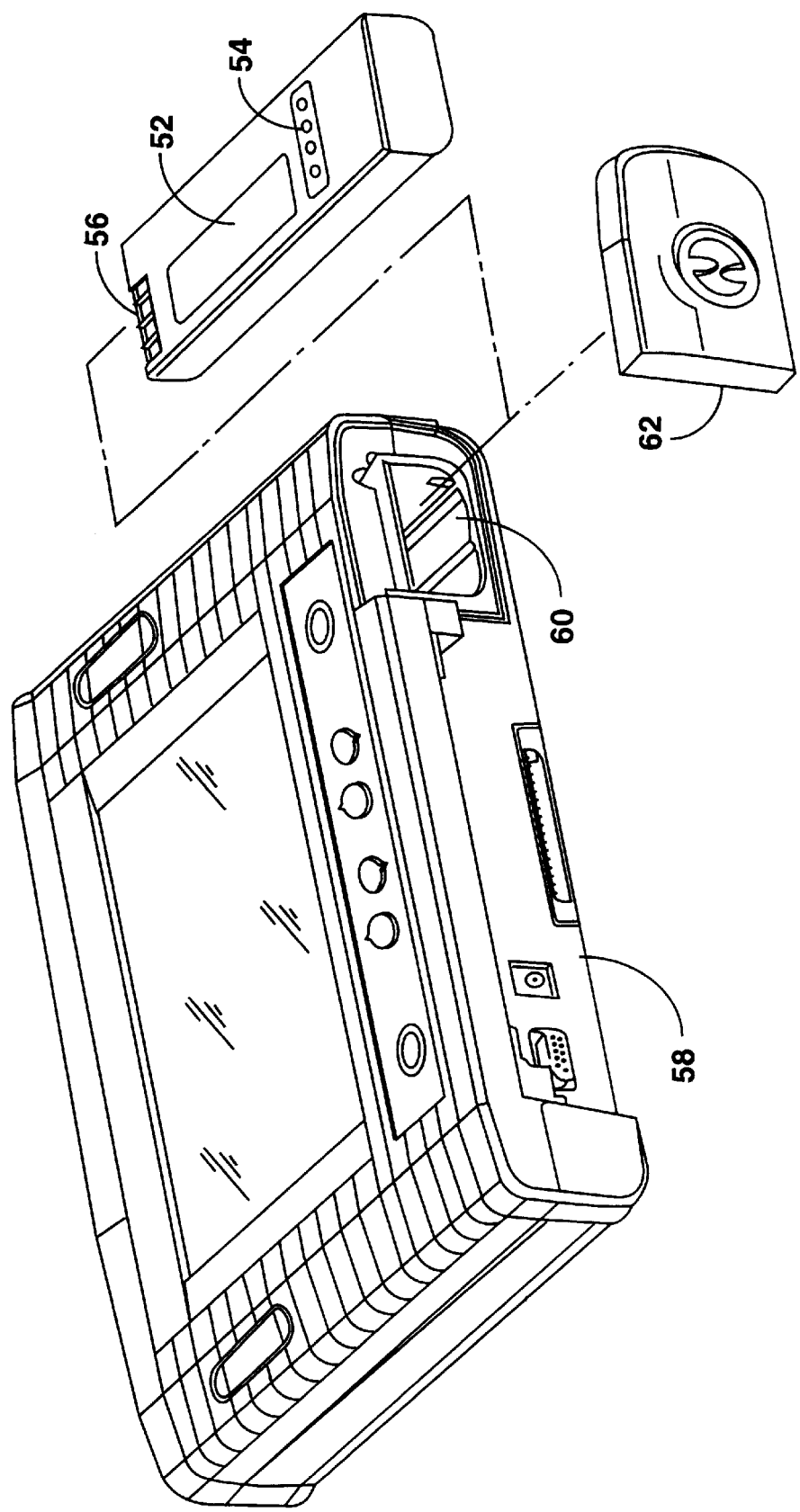
FIG. 5 is a perspective view illustrating the insertion and removal of an alternative rechargeable battery pack of the present invention to be utilized with an alternative portable battery powered data terminal.

FIG. 5 illustrates an alternative portable data terminal adapted to utilize an alternative rechargeable battery pack of the present invention. The alternative rechargeable battery pack 52 may be designed to carry a larger number of rechargeable electrochemical cells than are utilized in the rechargeable battery pack 10 of FIGS. 1 and 2 in order to provide the alternative battery pack 52 with a greater capacity. The alternative rechargeable battery pack 52 may thus have a size and configuration to accommodate a larger number of electrochemical cells as is shown in FIG. 5.

The alternative rechargeable battery pack 52 may have disposed thereon a battery capacity indicator display 54 generally corresponding to and providing the same function as the indicator display 14 of the battery pack 10 shown in FIG. 1. The alternative rechargeable battery pack 52 may also have disposed at an end thereof an array of contact terminals 56 generally corresponding to and providing the same function as the contact terminals 14 of the battery pack 10 shown in FIG. 1. The alternative rechargeable battery pack 52 is preferably optimized for utilization in the alternative portable data terminal 58 shown in FIG. 5. The alternative portable data terminal may generally be larger and consume more power than the data terminal 30 shown in FIGS. 3 and 4 and thus require the larger capacity of alternative rechargeable battery pack 52, for example. The rechargeable battery pack 52 may be slidably insertible into and out of the battery pack receiving cavity 60 of data terminal 58. Spring contacts (not shown) in cavity 60 corresponding to electrical contacts 56 may make electrical mating contact therewith when battery 52 is inserted into cavity 60 in a manner substantially analogous to the insertion of battery pack 10 into cavity 38 described in the description of FIG. 4 and as shown in FIG. 4. An endcap 62 may be utilized to secure the battery pack 52 in the battery cavity 60 of portable data terminal 58.

Figure 6:
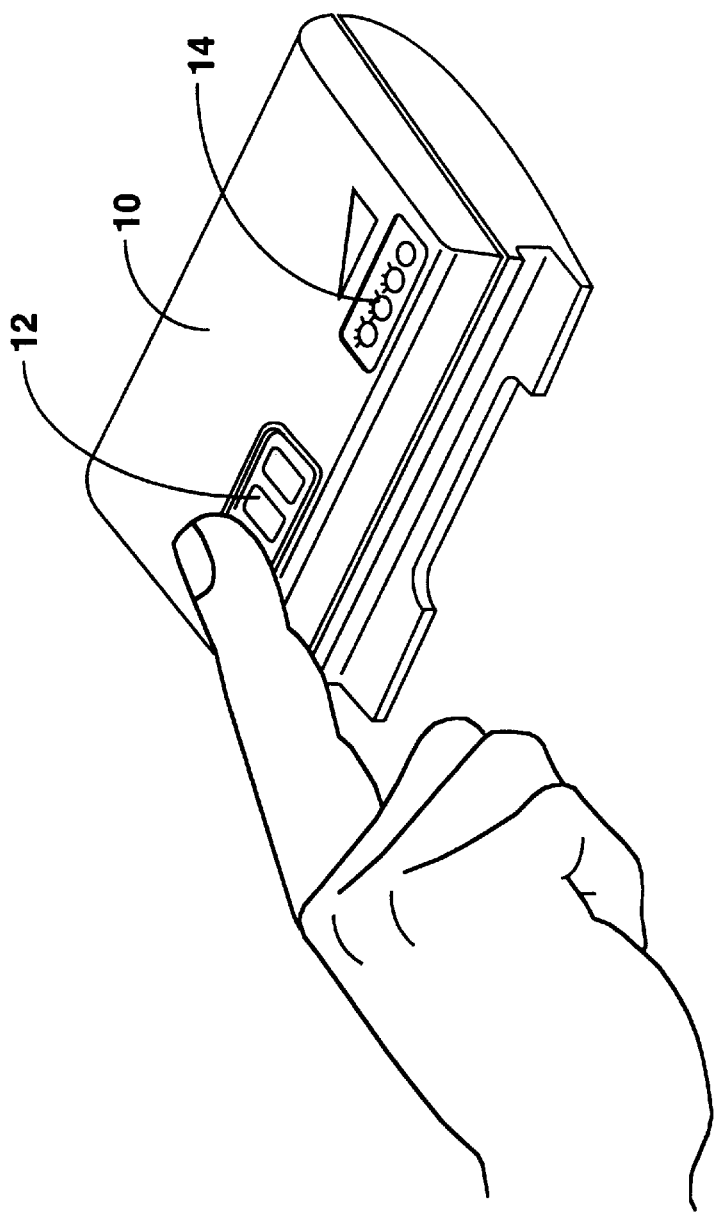
FIG. 6 is a perspective view which illustrates exemplary operation of the present invention as embodied in the rechargeable battery pack of FIG. 1.

FIG. 6 illustrates exemplary operation of the present invention showing the operation of the battery indicator display. The operator of a portable electronic device such as a data terminal that utilizes a rechargeable battery pack such as battery pack 10 may desire to readily determine the remaining charge capacity of the battery pack 10 before insertion thereof into the electronic device. The operator may have a large number of battery packs 10 from which to choose and may desire to quickly, simply and accurately know which of the battery packs has the greatest remaining capacity and to determine whether the battery pack 10 has enough capacity to last the duration of intended use.

The battery pack 10 preferably includes means to indicate to the user the remaining capacity thereof. The operator preferably shorts two contacts in the array of electrical contacts 12 in order to switch on the capacity indicating means comprising electric circuitry 28 within the battery pack 10 and a capacity indicator display 14 as shown in FIG. 2. Upon the operator shorting the contact terminals 12 preferably with a finger or other digit, the internal electronic circuitry 28 of the battery pack of FIG. 2 initiates indication to the user of the capacity of the electrochemical cells 22 and 24. The total remaining capacity of the battery pack 10 is preferably displayed by battery capacity indicator display 14 which preferably comprises a linear array of four light emitting diodes. As shown in FIG. 5, the LED's sequentially illuminate to thereby indicate to the operator the amount of capacity remaining therein.

Upon shorting of the contacts 12 by the operator, when only the first LED in the display 14 is illuminated the present capacity of the battery pack 10 is below 25% of its total capacity. When the first and second LED's only are illuminated the present capacity battery pack 10 is between 25% and 50% of its total capacity. When the first, second and third LED's only are illuminated the present capacity of the battery pack 10 is between 50% and 75% of its total capacity. When all four LED's are illuminated the present capacity of the battery pack 10 is above 75% of its total capacity. The operator may thereby readily determine the present charge state of the rechargeable battery pack 10 of the present invention.

In an alternate embodiment, if the charge is at least 25%, the first LED is continuously illuminated. Otherwise the first LED is flashed on and off at a rate indicative of the portion of the 25% that is remaining. For example, if the battery pack is completely depleted, the first LED is always off. If the battery pack has 12% of the capacity remaining, an on-off flash rate of approximately 0.5 cycles per second is used. If the battery pack has 20% of the overall capacity remaining, the on-off flash rate of about 1 cycle per second is used. At 25%, the first LED remains on continuously. In all flashing states, the on time remains constant while the off time is adjusted up or down to correspondingly indicate less or more of the 25% capacity actually remaining. Similarly, the second, third and fourth LED's slide from continuously on to on-off cycling to always off based on the corresponding amount of 25–50%, 50%–75% and 75%–100% of capacity currently available. Thus, for example, if 62% capacity remains, the first and second LEDs would be continuously illuminated, the third LED would flash at approximately a 0.5 cycles per second rate, and the fourth LED would be continuously off.

Figure 7:
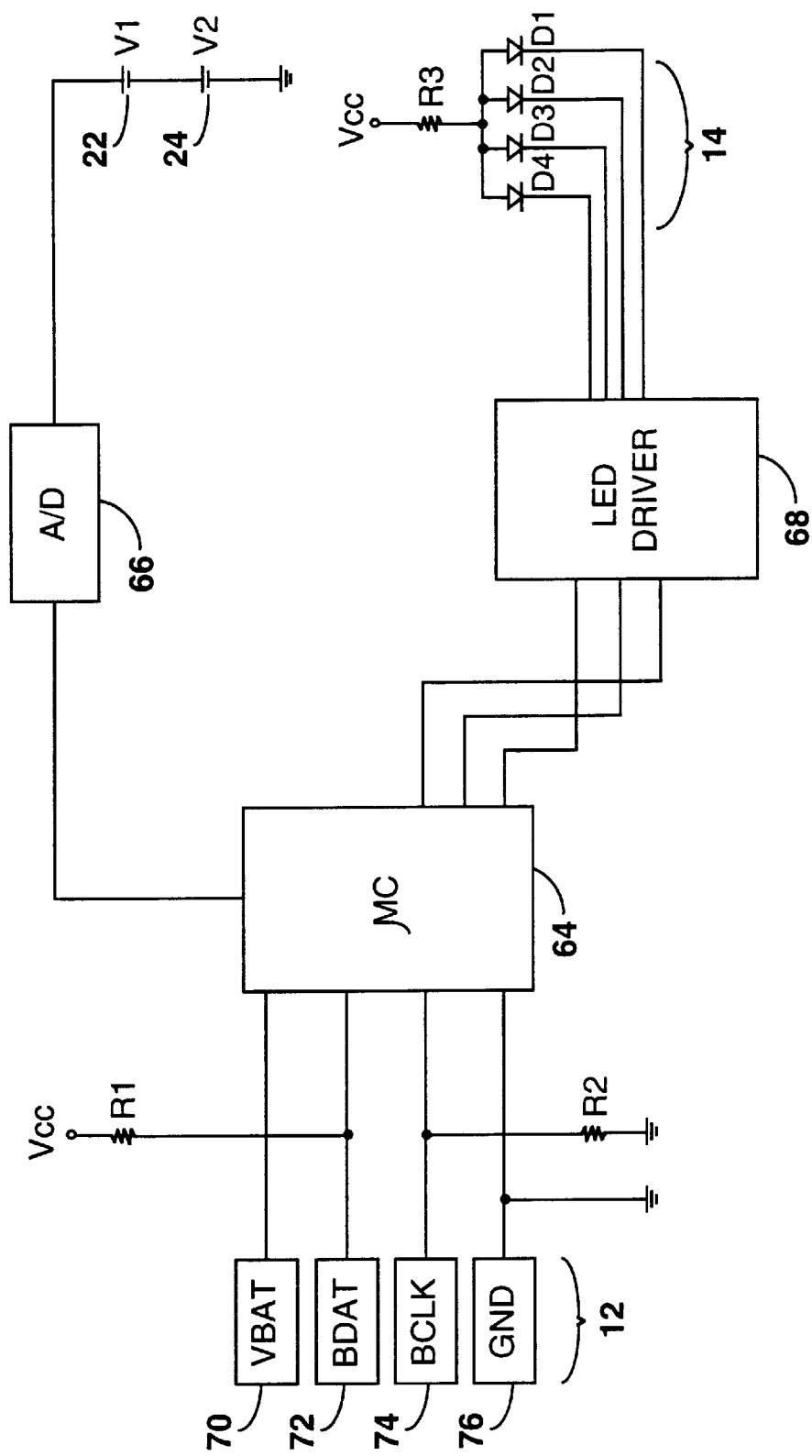
FIG. 7 is a schematic block diagram depicting the electronic circuitry of the battery pack of FIG. 1.

FIG. 7 illustrates schematically the battery capacity indicating circuitry of the present invention. The circuitry of FIG. 7 is preferably included with the battery pack circuitry 28 of circuit board 26 as shown in FIG. 2. The battery capacity indicating circuitry of FIG. 7 preferably comprises a microcontroller ("uP") 64 for electronic data processing functions. The microcontroller 64 is preferably a Microchip PIC 16C71 microcontroller. The array of contact terminals 12 preferably connect to microcontroller 64 and preferably include a positive battery output contact ("VBAT") 70, a battery data contact ("BDAT") 72, a battery clock contact ("BCLK") 74, and a ground contact ("GND") 76.

An analog-to-digital converter ("A/D") 66 preferably connects between electrochemical cells ("V1") 22 and ("V2") 24 and microcontroller 64. The analog-to-digital converter 66 preferably receives a magnitude-scaled analog input voltage from electrochemical cells 22 and 24 and generates a binary-coded number proportional to the analog input voltage which is provided to microcontroller 64. The microcontroller 64 preferably provides an output signal to an LED driver circuit ("LED DRIVER") 68 which operably drives the indicator display 14 comprising light emitting diodes D1, D2, D3 and D4.

The operator preferably initiates the battery capacity indicating circuit of FIG. 7 by shorting the BDAT contact 72 with either the BCLK contact 74 or the GND contact 76. When the battery pack 10 as shown in FIG. 1 is removed from a portable electronic device the internal electronic circuitry 28 as shown in FIG. 2 is preferably placed into a suspend mode. When battery pack 10 is in a suspend mode the BDAT contact 72 may be initially charged to a high voltage state through supply voltage VCC via resistor R1. Upon the operator shorting the BDAT contact with the BCLK contact, the BDAT contact voltage switches from a high voltage state to a low voltage state through resistor R2 which has a resistance less than the resistance of resistor R1. Alternatively, the BDAT contact may be directly shorted to ground through the GND contact. The BDAT contact connects to a negatively edge-triggered input of microcontroller 64. The shorting of the BDAT contact from a high voltage state to a low voltage state triggers the negatively edge-triggered BDAT input of microcontroller 64.

Upon microcontroller 64 receiving and detecting a transition from high to low in the BDAT signal, microcontroller 64 preferably sends a signal to the LED driver such that the LED's may be illuminated according to the present charge state of the rechargeable battery pack 10. The present state of charge of the battery pack 10 is preferably determined from measurement of the total present output voltage of electrochemical cells 22 (V1) and 24 (V2). The present total analog output voltage of electrochemical cells 22 and 24 is preferably converted into a digital signal by analog-to-digital converter (A/D) 66 which provides microprocessor 64 with a digital signal proportional to the output voltage of electrochemical cells 22 and 24. The processor then preferably sends control signals to LED driver 68 to drive the LED's D1, D2, D3 and D4 in response to the present state of charge of the battery pack 10 as determined from a measurement of the present output voltage of electrochemical cells 22 and 24.

Microprocessor 64 may be programmed with a routine that determines the present capacity of the battery pack based upon the present battery voltage. The output voltage of an electrochemical cell with respect to capacity of the cell may be defined for the given type of electrochemical cell utilized in the battery pack 10. In a preferred embodiment of the present invention, the electrochemical cells 22 and 24 comprise lithium ion type cells. Two electrochemical cells 22 and 24 connected in series may produce a total output voltage of 8.4 volts (4.2 volts per cell) when charged to full capacity and a total output voltage of 6.0 volts (3.0 volts per cell) when discharged to nearly zero remaining capacity.

The output voltage of a lithium ion cell decreases somewhat linearly with respect to capacity when discharged with a constant current over a substantial portion of the discharge cycle. Therefore, a linear correlation between the output voltage of electrochemical cells 22 and 24 and the capacity of battery pack 10 may provide an accurate approximation of the capacity of the battery pack when four states of charge are utilized. Alternatively, the nonlinearity of the correlation between voltage and capacity may also be taken into account.

Thus, when the output voltage of electrochemical cells 22 and 24 is 7.8 volts or greater, all four LED's D1–D4 may illuminate when the BDAT contact is shorted, thereby indicating greater than 75% remaining capacity, for example. When the output voltage of electrochemical cells 22 and 24 is between 7.2 volts and 7.8 volts, LED's D1 through D3 illuminate when the BDAT contact is shorted, thereby indicating 50% to 75% remaining capacity. When the output voltage of electrochemical cells 22 and 24 is between 6.6 volts and 7.2 volts, LED's D1 and D2 illuminate when the BDAT contact is shorted, indicating thereby indicating 25% to 50% remaining capacity. When the output voltage of electrochemical cells 22 and 24 is between 6.0 and 6.6 volts, LED D1 illuminates when the BDAT contact is shorted, thereby indicating less than 25% percent remaining capacity. When the output voltage of electrochemical cells 22 and 24 falls below 4.7 volts (2.35 volts per cell) the battery pack 10 is completely discharged and no LED's illuminate. The actual voltages which demark the capacity ranges of the battery pack 10 may be determined according to the type of battery and electrical configuration of the electrochemical cells utilized therein.

Figure 8:
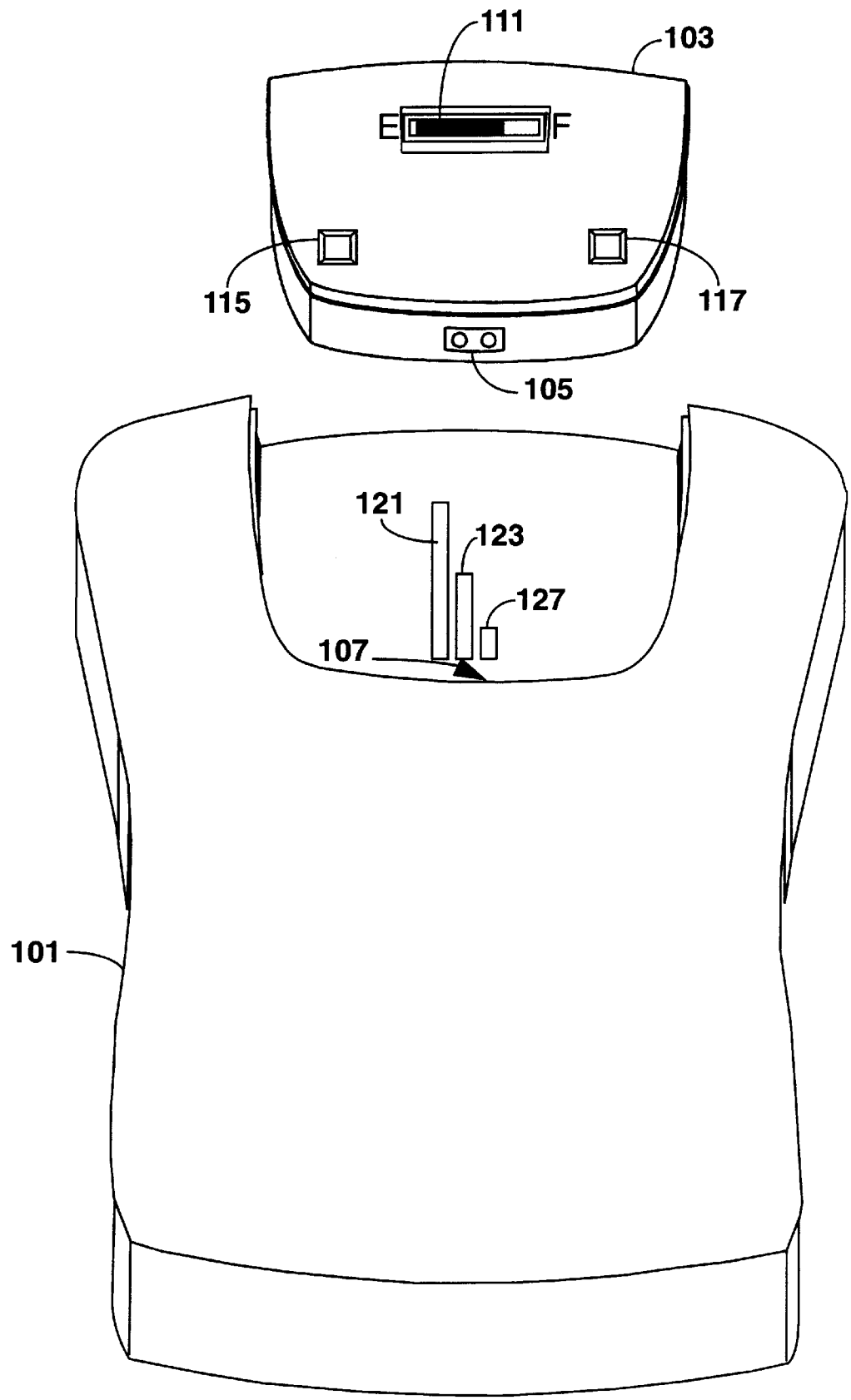
FIG. 8 is a perspective view that illustrates another embodiment of the present invention in which a portable terminal utilizes a battery pack supporting infrared communication, capacity indication and pre-removal sensing.

FIG. 8 is a perspective view that illustrates another embodiment of the present invention in which a portable terminal utilizes a battery pack supporting infrared communication, capacity indication and pre-removal sensing. In particular, a battery pack 103 may be inserted in or removed from a slot in the bottom of a portable terminal 101. The battery pack 103 comprises an LCD display 111 that, upon request, provides an indication of current battery capacity. To request the indication, a user merely places one finger on a contact 115 and one finger on a contact 117 to complete a pathway monitored by a sensing circuit within the battery pack 103. In response, the display 111 is activated to display the current battery capacity. As illustrated, the battery capacity is represented in a fuel-gauge type display with "E" and "F" designating "empty" and "full", respectively.

Such requests to display battery capacity can be conducted when the battery pack 103 is either installed within or removed from the portable terminal 101. However, to prevent unintended display (which wastes battery power), the contacts 115 and 117 are both recessed and must be "shorted" to enable the display of battery capacity information.

To minimize the number of contacts in the interface between the battery pack 103 and the terminal 101, an infrared transceiver 105 disposed on the front of the battery pack 103 communicates to a counterpart infrared transceiver (not shown) disposed at a location 107. Upon insertion of the battery pack 103 into the slot in the terminal 101, three contacts on the underside of the battery pack engage contacts 121, 123 and 125 to provide power to the terminal 101. The contacts 121 and 123 provide ground and Vcc to the terminal 101. The ground contact 121 is longer than the Vcc contact 123 so that Vcc will be removed prior to ground during removal of the battery pack 103 from the slot. Similarly, ground will be applied prior to deliver of Vcc upon insertion.

The received Vcc and ground signals are delivered by the battery pack 103 via the contacts 121 and 123 to power regulation circuitry within the terminal 101. The contact 125 also delivers Vcc, but is used by the terminal 101 as a pre-removal indication. Particularly, when the battery pack 103 begins to slide out of the slot in the terminal 101, path from Vcc at the battery pack 103 to the contact 125 is the first contact to be broken because it is the shortest. In response, the terminal 101 responds by immediately saving operational state information and data in preparation for power failure to the terminal 101. This preparatory process may take, for example, 50 milliseconds of time to complete. Based on the removal rate and difference in lengths between the contacts 123 and 125, the preparatory process should always occur prior to removal of Vcc via the contact 123. Once Vcc is interrupted through the contact 123, the terminal 101 loses power and with it all functionality. Thereafter, as the battery pack 103 continues to be removed, ground delivery via the contact 121 is interrupted, and, then, the battery pack 103 is completely removed.

Upon beginning insertion of a charged battery pack back into the slot of the terminal 101, the ground pathway will be restored first via the contact 121 followed by Vcc via the contact 123. Thereafter, when the contact 125 receives Vcc, the terminal 101 responds by restoring operational status and data to permit the operator to continue from the point left when the battery pack 103 was being removed.

Thus, battery packs may be easily removed and replaced without worrying about losing data or operational status. The operator need provide no other indication to the terminal 101 of the intent to remove a battery pack than by beginning the process of removal. The removal indication will be delivered via the contact 125 prior to removing power via the contacts 121 and 123. Similarly, if the terminal 101 happens to be dropped dislodging the battery, the removal indication will be received and responded to prior to losing power, preventing the loss of operational states and data.

The minimum length of the difference between the contacts 123 and 125 may be calculated by multiplying the worst case removal rate by the time needed to complete the preparatory process. For example, if the worst case removal rate is one foot per second, to guarantee 50 milliseconds of preparatory processing time, the length of the difference is 0.05 feet or 0.6 inches.

Upon insertion of the battery pack 103, the terminal 101 also responds by retrieving battery capacity information from the battery pack 103 via the infrared transceiver 105 and corresponding infrared transceiver located at 107. With the battery capacity information, the terminal 101 considers its own average, minimum and peak power loading information to calculate an estimated range of time remaining for battery usage. The available time range estimate is then displayed to the operator to enable a better calculation as to the number of battery packs needed to service a given task.

Figure 9:
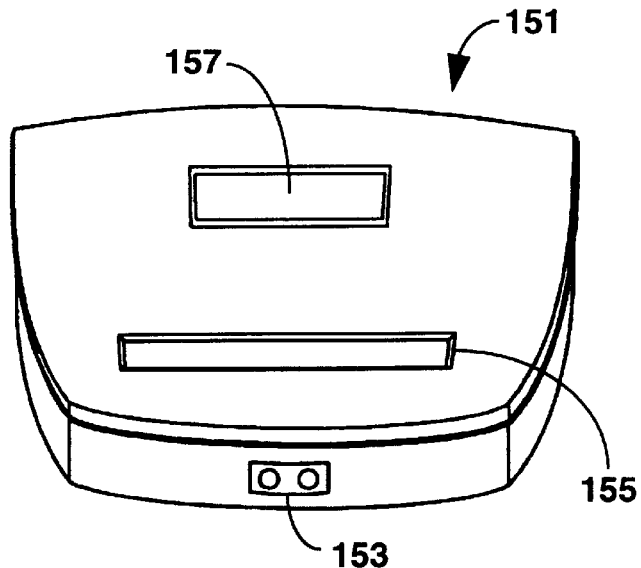
FIG. 9 is a perspective view illustrating a further embodiment of the battery pack of FIG. 8 which includes an LCD (Liquid Crystal Display) screen that is used to display both available capacity and remaining time estimates.

FIG. 9 is a perspective view illustrating a further embodiment of the battery pack of FIG. 8 which includes an LCD (Liquid Crystal Display) screen that is used to display both available capacity and remaining time estimates. Specifically, a battery pack 151 operates much the same as the battery pack 103 of FIG. 8. Three contacts (not shown) on the bottom side of the battery pack 151 function to provide power and pre-removal indications as previously described. A transceiver pair 153 is also provided for communication between the battery pack 151 and a terminal. However, instead of two touch contacts (e.g., the contacts 115 and 117 of FIG. 8), the battery pack 155 utilizes a single touch contact 155 to initiate the delivery of charge status to an LCD display 157 for viewing. The contact 155 is recessed to prevent unintentional such initiation. Moreover, a timing circuit prevents the contact 155 from holding the display 157 and associated circuitry in an active state for more than a ten (10) second interval. After the ten second display period, deactivation occurs whether or not the contact 155 is being touched. Thereafter, the contact 155 must be released and touched again before the display 157 and associated circuitry will be reactivated. Such activation may be initiated when the battery pack 157 is either installed or removed.

Figure 10:
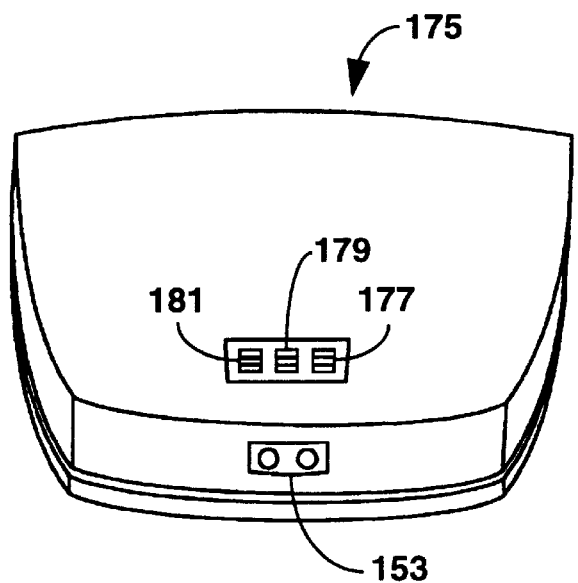
FIG. 10 is a perspective view illustrating the front and bottom side of the battery packs of FIGS. 7 and 8.

FIG. 10 is a perspective view illustrating the front and bottom side of the battery packs of FIGS. 7 and 8. In particular, a battery pack 175 includes three contacts 177, 179 and 181 corresponding to ground, Vcc and pre-removal sensing functionality. In other words, when to the battery pack 175 is inserted, the contacts 177, 179 and 181 slidingly engage the contacts 121, 123 and 125 of FIG. 8. Each of the contacts 177, 179 and 181 extend beyond housing of the battery pack 157 to ensure coupling with the corresponding contacts 121, 123 and 125. As the battery pack 175 is removed from the terminal 101 (FIG. 8), engagement is sequentially lost as previously described to permit pre-removal sensing and preparatory processing prior to the removal of power.

Figure 11:
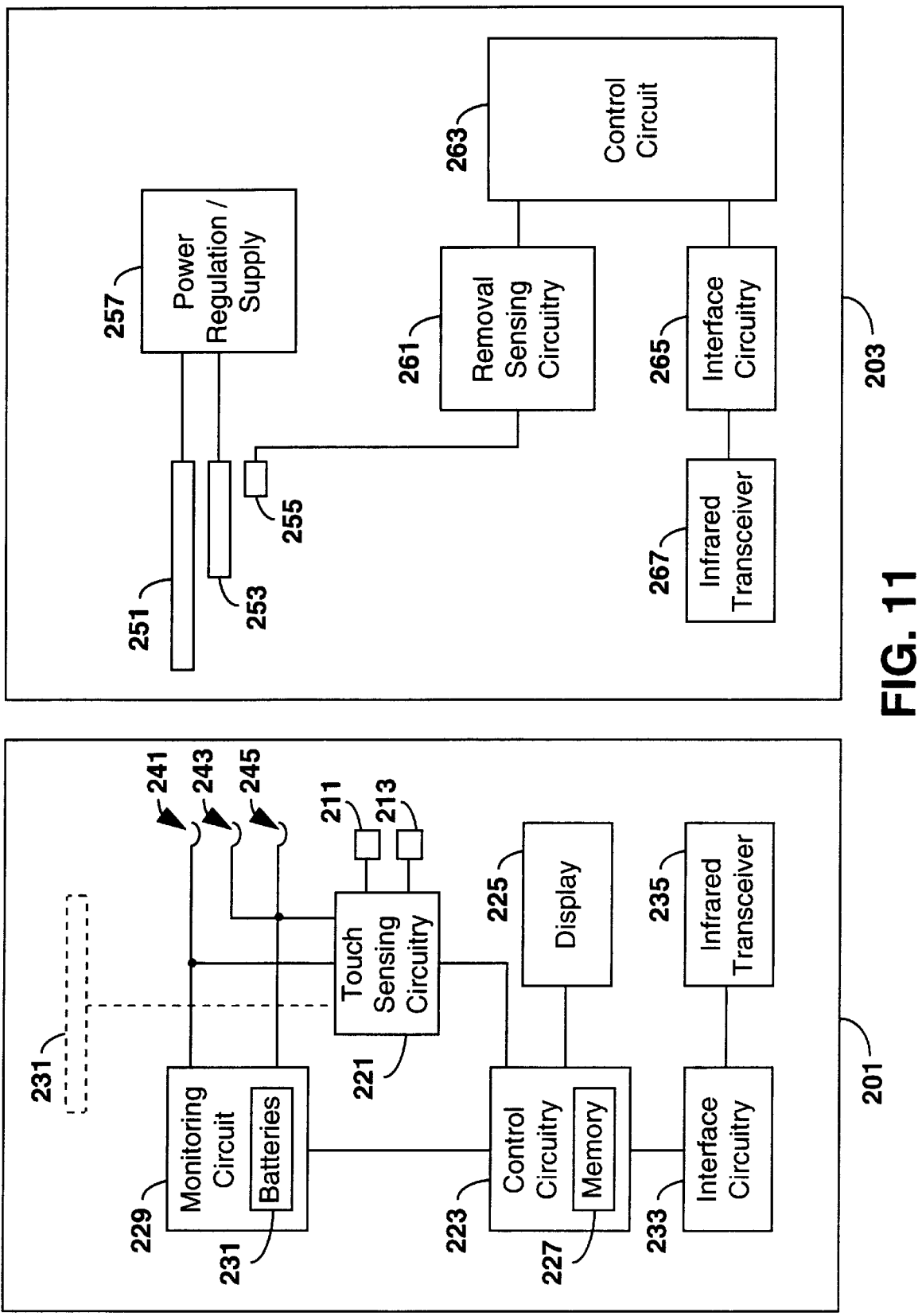
FIG. 11 is a schematic block diagram that illustrates the functionality of one embodiment of the circuitry that may be used in the portable terminal and battery packs illustrated in FIGS. 8–10.

FIG. 11 is a schematic block diagram that illustrates the functionality of one embodiment of circuitry that may be used in the portable terminal and battery packs illustrated in FIGS. 8–10. A battery pack 201 provides an operator with an indication of battery capacity whether or not it is inserted into a portable electronic device 203. To initiate the display of battery capacity, an operator touches a pair of contacts 211 and 213. A touch sensing circuit 221 detects the resultant impedance change across the contacts 211 and 213, and activates a control circuit 223 to service the request. Alternatively, instead of utilizing the pair of contacts 211 and 213, the single contact 231 might be used in a capacitive sensing arrangement as illustrated in FIG. 9. In either configuration, the control circuit 223 responds to the request by delivering charge status information to the operator via a display 225.

The control circuit 223 retrieves charge status information from a memory 227. Such information includes the amount of charge stored by batteries 231 when they are fully charged, and the used amount of such charge. Such information is generated and updated via interaction by the control circuit 223 with a monitoring circuit 229 which determines capacity by monitoring recharging and charge delivery.

The control circuit 223 manipulates the charge status information into an appropriate form for viewing via the display 225. Specifically, if the battery pack 201 is not inserted into the device 203, the control circuit 223 identifies a ratio or percentage corresponding to the currently available capacity. The percentage is then formatted to correspond to the type of display that is being used. The control circuit 223 then delivers the formatted percentage to the display 225 for viewing for a five second time period.

If inserted into the device 203, the battery pack 201 identifies information regarding the peak, minimum and typical loading caused by the device 203 and calculates minimum maximum and time estimates regarding remaining battery life. Instead of (or in addition) displaying the percentage of available battery capacity, the control circuitry 223 interacts with the display 225 to deliver the time estimates to the operator. With peak, typical and low power consumption time estimates, the operator can more easily determine whether the battery pack 201 will be sufficient for a given task.

The control circuit 223 receives the peak, minimum and typical loading characteristics via interface circuitry 233 and an infrared transceiver 235 when the battery pack 201 is inserted into the portable electronic device 203, although such characteristics may be delivered on a request by request basis. In an alternate embodiment, the control circuit 223 determines the peak, minimum and typical loading characteristics of the device 203 through monitoring the actual charge delivery identified through the monitoring circuit 229.

The portable electronic device 203 also utilizes pre-removal sensing functionality. Contacts 251 and 253 deliver ground and Vcc, respectively, as they encounter the corresponding battery pack contacts 241 and 243. Similarly, a sense contact 255 receives Vcc via a corresponding battery pack contact 245. When fully inserted, the battery pack contacts 241, 243 and 245 engage the corresponding contacts 251, 253 and 255, and, if sufficient power is available, the device 203 may enter a fully operational state when the operator so desires. Upon beginning to remove the battery pack 201 from the device 203, the connection between the contacts 255 and 245 breaks first. A removal sensing circuit 261 immediately detects the disengagement, and interrupts a control circuit 263 from ongoing processing. In response, the control circuit 263 saves all operational status and data, i.e., performs preparatory removal processing, before the operator has managed to extract the battery pack 201 far enough to break the connection between the contacts 243 and 253. When the connection between the contacts 243 and 253 break, Vcc is removed from the portable electronic device 203. Ground continues to be delivered for another period of time through the connection between the contacts 241 and 251. Thereafter, the battery pack 201 is fully removed.

Upon reinsertion of the battery pack 201 (or insertion of a charged counterpart), the control circuit 263 retrieves and restores the previously saved operational state and data before returning control to the operator and ongoing process. The control circuit 263 may include a processing unit and non-volatile storage for carrying out such functionality.

Figure 12:
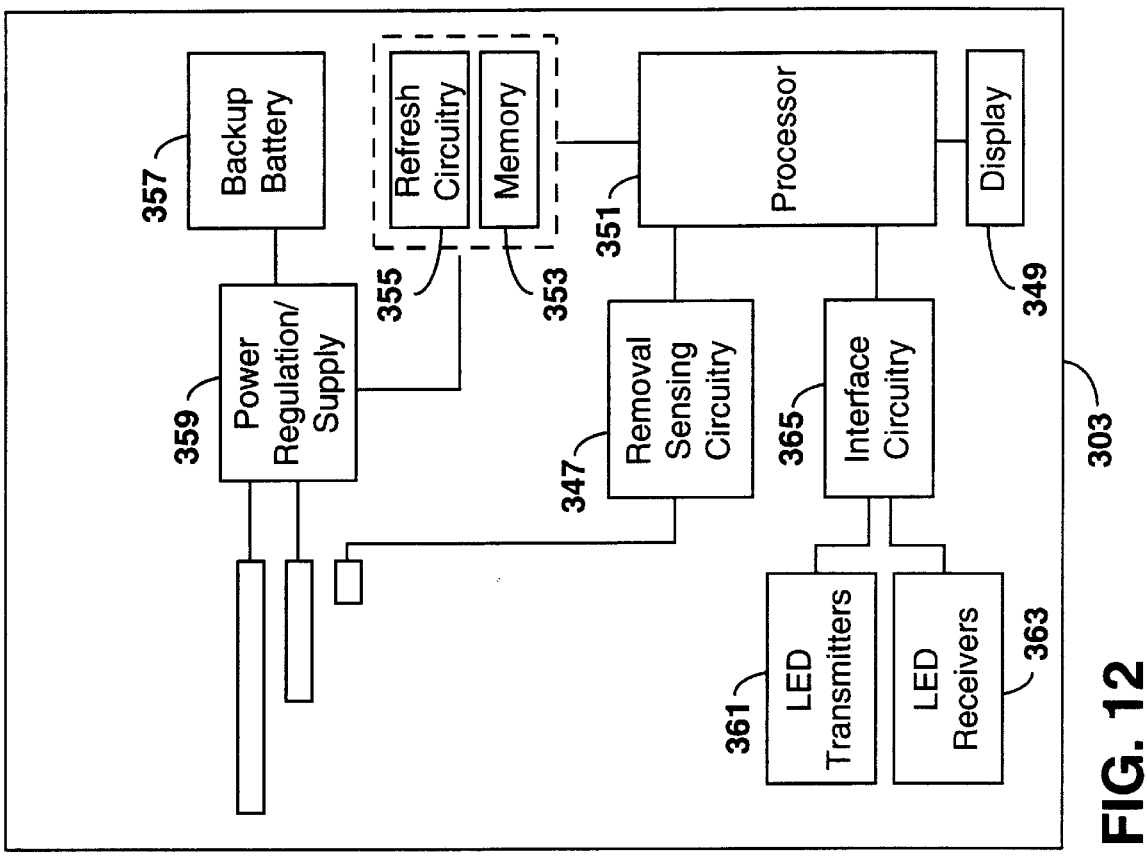
FIG. 12 is a schematic block diagram that illustrates an alternate embodiment of circuitry that can be incorporated into a portable terminal and battery packs such as those illustrated in FIGS. 8–10.
Figure 12:
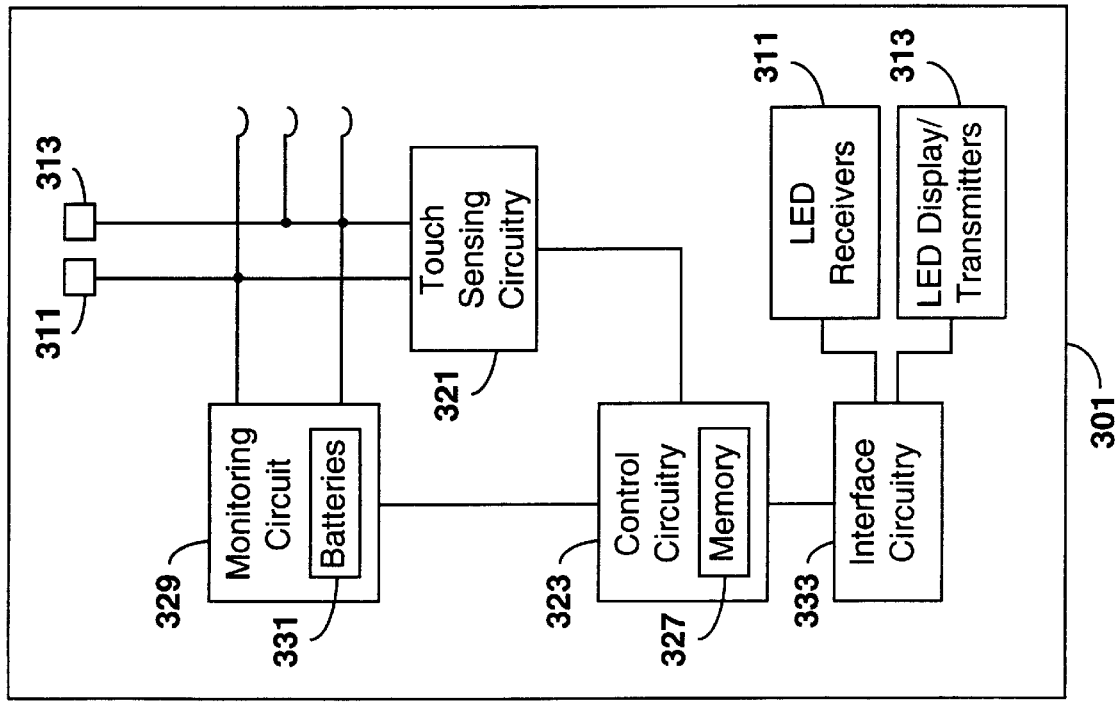

FIG. 12 is a schematic block diagram that illustrates an alternate embodiment of circuitry that can be incorporated into a portable terminal and battery packs such as those illustrated in FIGS. 8–10. With the following exceptions, the schematic block diagram of FIG. 12 illustrates operation very similar to that of FIG. 11. In particular, a battery pack 301 communicates to a portable electronic device 303 via one or more LED transmitters 313 to a corresponding number of LED receivers 363. Similarly, communication in the other direction flows via one or more LED transmitters 361 to a corresponding number of LED receivers 311. Such communication is managed by a control circuit 223 via an interface circuit 333 and a processor 321 via an interface circuit 365.

The advantage of using LED transceiver pairs for communication is that they also serve as the display for the battery pack 301. For example, referring to FIG. 1, the battery pack 10 utilizes a series of LED's 14 which may be used to communicate with an appropriately configured terminal, instead of having to use another full infrared transceiver set. Thus, the cost, complexity and reliability of the battery pack 301 is enhanced.

With touch contacts 311 and 313 attached directly to the power and ground lines, the operator's simultaneous touching of the contacts 311 and 313 operates to trigger a touch sensing circuit 321 when the battery pack 301 is removed from the device 303. When inserted and the device 303 is drawing power, the touching by the operator of the contacts 311 and 313 will not trigger the touch sensing circuit 321. In this way, a more appropriate display located on the device 303 may be used to display charge information, and unintentional touching during operation of the device 303 is ignored.

When the device 303 is operational, the processor 351 periodically communicates to the battery pack 301 to retrieve battery capacity information. The processor 351 uses such information along with information regarding the peak, typical and minimum loading characteristics of the device 303 to estimate the remaining operational time achievable with the presently installed battery pack. Such estimates along with capacity percentages are delivered to a display 349 for viewing. Based on the time estimates, an operator may make more accurate determinations as to when other battery resources must be requested or retrieved with sufficient time to carry out procurement and installation prior to being stranded with a depleted battery pack.

Additionally, instead of using non-volatile memory to store operating status and data, the processor 351 utilizes volatile memory which is maintained during battery pack exchanges by a backup battery 357. Because it is desirable to conserve the charge of the backup battery 357, the processor 351 responds to a pre-removal indication from a removal sensing circuit 347 by storing all operational states and data in DRAM (dynamic read only memory) 353 directs the powering down of itself as well as all other conventional circuitry. However, even though power from the battery pack is removed when the corresponding Vcc contacts disengage, a power regulation/supply circuit 359 continues to deliver power from the backup battery 357 to the DRAM 353 and accompanying refresh circuitry 355, maintain the storage. As soon as a replacement battery pack is inserted, the backup battery 357 is no longer relied upon, and the processor 351 restores the stored operating states and data.

In view of the above detailed description of the present invention, other modifications and variations will now become apparent to those skilled in the art. It should also be apparent that such other modifications and variations may be effected without departing from the spirit and scope of the present invention.

We claim:

1. A battery pack that may be inserted by an operator into an electronic device to supply power to the electronic device, the battery pack comprising:

a housing;

a rechargeable battery, disposed within the housing, having a current charge useable by the electronic device when inserted therein;

at least one terminal disposed on the housing;

a sensing circuit that detects the operator making contact with the at least one terminal;

a display disposed on the housing; and a control circuit responsive to the detection of the sensing circuit by delivering to the display information regarding the current charge of the rechargeable battery.

2. The battery pack of claim 1 wherein the at least one terminal disposed on the housing comprises a single terminal, and the sensing circuit monitors capacitance associated with the single terminal to detect the operator's contact.

3. The battery pack of claim 1 wherein the at least one terminal disposed on the housing comprises a pair of terminals, and the sensing circuit detects creation of a current pathway through the operator between the pair of terminals.

4. The battery pack of claim 1 wherein the control circuit computes usage time estimates when the battery pack is inserted in the electronic device based on the loading characteristics of the electronic device.

5. The battery pack of claim 1 further comprising a plurality of contact terminals disposed on the housing to provide power delivery to the electronic device when the battery pack is inserted therein.

6. The battery pack of claim 5 wherein the electronic device comprises a plurality of variable length contacts that engagingly couple with the plurality of contact terminals of the battery pack to provide pre-removal indications to the electronic device of impending power loss.

7. The battery pack of claim 5 further comprising a wireless transceiver for coupling battery charge information to the electronic device.

8. The battery pack of claim 7 wherein the display comprises at least a portion of the wireless transceiver.

9. The battery pack of claim 1 wherein, when the battery pack is coupled with the electronic device, the control circuit causes the delivery of current charge information to the electronic device to permit computation by the electronic device of remaining capacity time estimates based on the loading characteristics of the electronic device.

10. A battery pack that may be inserted by an operator into an electronic device to supply power to the electronic device, the battery pack comprising:

a housing;

a rechargeable battery, disposed within the housing, having a current charge useable by the electronic device when inserted therein;

a first, second and third contact disposed on the housing to engagingly couple to the electronic device when the battery pack is inserted into the electronic device;

the first and second contacts engagingly coupling with the electronic device to deliver power to the electronic device; and the third contact engagingly coupling with the electronic device that, during the process of removing the battery pack from the electronic device, delivers a pre-removal indication prior to the uncoupling of the first and second contacts from the electronic device.

11. The battery pack of claim 10 wherein the third contact is sized and positioned to deliver a pre-removal indication.

12. The battery pack of claim 10 wherein the third contact is shorter than the first and second contacts.

13. The battery pack of claim 10 further comprising:

at least one terminal disposed on the housing;

a sensing circuit that detects the operator making contact with the at least one terminal;

a display disposed on the housing; and a control circuit responsive to the detection of the sensing circuit by delivering to the display information regarding the current charge of the rechargeable battery.

14. The battery pack of claim 13 wherein the at least one terminal disposed on the housing comprises a single terminal, and the sensing circuit monitors capacitance associated with the single terminal to detect the operator's contact.

15. The battery pack of claim 13 wherein the at least one terminal disposed on the housing comprises a pair of terminals, and the sensing circuit detects creation of a current pathway through the operator between the pair of terminals.

16. The battery pack of claim 13 wherein the control circuit computes usage time estimates when the battery pack is inserted in the electronic device based on the loading characteristics of the electronic device.

17. The battery pack of claim 13 wherein, when the battery pack is coupled with the electronic device, the control circuit causes the delivery of current charge information to the electronic device to permit computation by the electronic device of remaining capacity time estimates based on the loading characteristics of the electronic device.

* * * * *